United States Patent Office 3,273,324
Patented Sept. 20, 1966

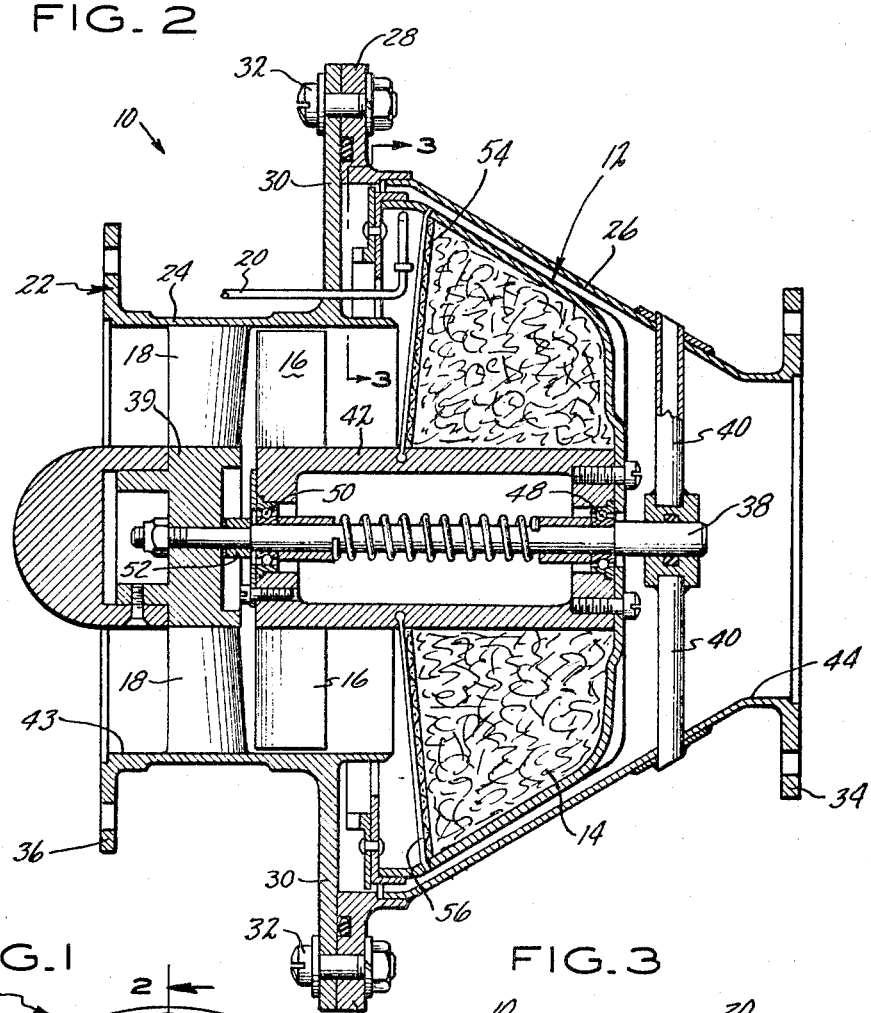
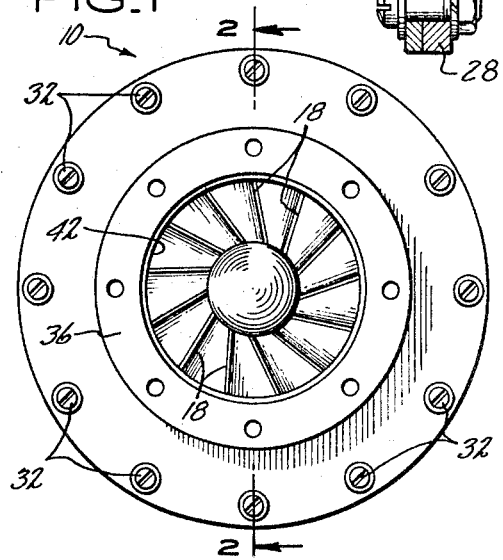
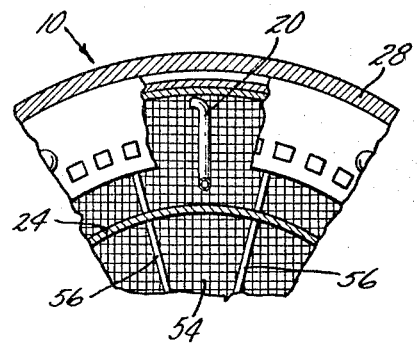

3,273,324
TURBINE DRIVEN ROTARY LIQUID-GAS SEPARATION SYSTEM
David C. Jennings, Windsor Locks, Conn., assignor to United Aircraft Corporation, East Hartford, Conn., a corporation of Delaware
Filed May 28, 1962, Ser. No. 198,364
1 Claim. (Cl. 55—404)

This invention relates to fluid separators and more particularly to a centrifugal type of separator adapted to remove a constituent from a moving fluid stream and capable of being operational in gravitational and non-gravitational fields.

Since the advent of space vehicles intended to carry man into outer space, it has become necessary to design equipment to control the environment to provide livable and comfortable conditions for the inhabitants. Owing to the lack of gravity, one of the problems associated with the design of such a vehicle is proper humidity control so that it becomes necessary to separate the moisture from the moving air stream in an amount equivalent to the latent heat load of the inhabitants of the space craft.

Another essential requirement for outer space vehicles is to reclaim the moisture removed so that it may be utilized for other purposes.

In designing a water separator for such an application, it is abundantly essential that the device is highly reliable and efficient and yet absorbs as little energy as possible so as not to overload the power supplies needed for the other operational devices.

While conventional centrifuges may be employed to separate the moisture content from a moving air stream, in a non-gravitational field, these heretofore known centrifuges are not capable of collecting the moisture once separated. This is because there are no forces acting on the particles for directing them in a particular direction, hence leaving these particles virtually suspended. In accordance with my invention, centrifugal forces utilized for separating the moisture from a moving air stream can also be utilized to gather the suspended droplets and deliver the collected water as necessary. By virtue of centrifugal forces, a simulated gravitational field is created for achieving these results. This is accomplished by providing a rotating mesh water separator which imparts a centrifugal load on the removed water and collecting this water in a rotating peripherally opened reservoir. A self-pumping water pickup is disposed in the reservoir for delivering the water as needed. To date, a rotating water separator as described has been tested which evidenced an efficiency of water removal ability substantially equalling 100%.

It is therefore an object of this invention to provide a rotating water separator operational in a gravitational and a non-gravitational field.

It still is a further object of this invention to provide a rotating drum consisting of a mesh material and an open peripheral reservoir formed by the drum.

A still further object of this invention is to provide in combination with a rotating water separator, a self-pumping water pickup.

It still is a further object of this invention to provide a water separator having self-pumping ability which is characterized as being relatively simple, exhibiting a high degree of reliability, low pressure drop and low weight and volume penalties.

It is a still further object of this invention to provide for a separator as described, self-propelling means.

Other features and advantages will be apparent from the specification and claim and from the accompanying drawings which illustrate an embodiment of the invention.

FIGURE 1 is a top view of the water separator.

FIGURE 2 is a sectional view taken along line 2—2 of FIGURE 1.

FIGURE 3 is a fragmentary view in section taken along line 3—3 of FIGURE 2.

Now referring to FIGURES 1 through 3, which generally show the water separator 10 comprising a rotating drum 12 containing mesh material 14, air turbine 16 to drive the rotating drum, stator member 39, a stationary water pickup 20 and a housing 22. The housing is formed by an upper casing member 24 and a lower casing member 26. The lower and upper casing members each carry annular flanges 28 and 30 respectively containing a plurality of complementary openings spaced around the circumference for receiving nut and bolt assemblies 32 for securing both casing members to each other. Each casing member may contain annular flanges 34 and 36 for mounting in a suitable ducting system. A central shaft 38 extending through the housing is supported by stator member 39 at the top end and a plurality of strut members 40 at the lower end. Stator member 39 carries a plurality of stator vanes 18 disposed about its axis for imparting a swirl to the incoming moisture-laden air being admitted through the opening 43. This air then impinges against the buckets of the turbine 16 which is secured to the rotating hub 42 for driving the rotating drum 12. The air discharged from the turbine is forced through the mesh in an axial direction and discharged through the opening 44 formed by lower casing. The smaller end of the drum 12 contains a plurality of openings (not shown) which permit the passage of air through the drum in an axial direction. Centrifugal action imparted to the water droplets by the mesh rotation, forces them to travel radially until they reach the interior drum surface. Since the drum is formed into a truncated cone, the impinged water droplets impinging against the inner surface are forced upwardly to the larger diameter of the drum which forms an open rotating peripheral reservoir 51 for collecting the water.

Removal of the water from the reservoir is accomplished through the pumping action provided by the stationary water pickup or pump which comprises a hollow tubular member extending through the housing into the the water-filled reservoir. The open end of the stationary pump terminates in the proximity of the inner wall of the hub at the reservoir and faces in a direction opposing the direction of the rotating hub. Owing to the fact that a centrifugal head is obtained (simulated gravity field), with respect to the opposite end of the tubular member when connected to lower pressure receiver (not shown), the ensuing pressure drop across the tubular member will force water to flow therethrough.

Still referring to FIGURES 1 through 3, the drum 12 carried by rotating hub 42 is supported to stationary shaft 38 by bearings 48 and 50. The shaft is positioned for alignment purposes by spacer 52. Since the over-all weight of the assembly is low and since the applied forces due to the lower speed are low, the loads absorbed by the bearing will be low, hence providing a long operating life and high reliability.

The mesh may consist of a woven matrix of aluminum wire which is crimped and rolled in a spiral until the mesh configuration is obtained. The wire mesh is then inserted into rotating drum and restrained by screen 54 and retaining members 56.

What has been shown by this invention is an efficient device for removing one constituent from a moving fluid stream which is capable of operating in both a gravitational and a non-gravitational field. The device is characterized by being simple, economical to manufacture, capable of continuous use, providing a relatively low overall pressure drop and yet being capable of rugged use.

While the preferred embodiment has been described to illustrate the removal of moisture from a moisture-ladened air stream, it should be understood and will be apparent to those skilled in the art that the device described may be employed to separate other types of constituents retained in a moving fluid stream.

It is to be understood that the invention is not limited to the specific embodiment herein illustrated and described, may be employed to separate other types of constituents retained in a moving fluid stream.

It is to be understood that the invention is not limited to the specific embodiment herein illustrated and described, but may be used in other ways without departing from its scope and spirit.

I claim:

The combination of a duct having wall means defining an enlargement therein, said duct having a longitudinal axis, said enlargement containing a rotary centrifugal separator for removal of liquid entrained in gas flowing in said duct, said separator including an open ended hollow rotary frusto-conical element, said element being coaxially and rotatably mounted in said duct enlargement, an inwardly extending flange at the larger end of said element, said flange and said element defining an annular space within said element at the larger end of said element for the collection of liquid, a porous mass disposed within said element adjacent its smaller end, said mass peripherally engaging the interior surface of said element so that gas with entrained liquid flowing through said element must pass through said mass and so that the liquid in said gas is entrained in said mass to be carried by centrifugal force into the annular space as the element rotates, and means for removing liquid from the annular space including a fixed tube extending through said wall means defining an enlargement in said duct and terminating in an open end portion disposed in said annular space, said open end portion extending tangential to said annular space and in a direction opposite to the direction of rotation of said frusto-conical element, and means to rotate said frusto-conical element comprising a hub rotatably mounted coaxial with said longitudinal axis and extending through said frusto-conical element and having an end adjacent the larger diameter end of said frusto-conical element, a plurality of radially extending turbine buckets extending from and attached to the end of the hub at the larger diameter end of said frusto-conical element, a core member coaxial with said longitudinal axis, said core member disposed adjacent to the end of said hub at the larger diameter end of said frusto-conical element, a plurality of whirl inducing vanes attached to and extending radially from said core members, the radial extremity of each of said whirl inducing vanes being attached to said duct, and means connecting said frusto-conical element to said hub for rotating said frusto-conical element.

References Cited by the Examiner

UNITED STATES PATENTS

| 710,626 | 10/1902 | Smith | 55—404 |
|---|---|---|---|
| 881,723 | 3/1908 | Scheibe | 233—28 X |
| 1,002,471 | 9/1911 | Thelitz | 233—2 |
| 1,242,560 | 10/1917 | Kingsbury. | |
| 1,384,380 | 7/1921 | Bowdon | 55—408 |
| 2,335,420 | 11/1943 | Jones | 233—11 |
| 2,398,967 | 4/1946 | Schutte | 233—22 |
| 2,459,944 | 1/1949 | Jones et al. | 55—407 |
| 2,488,746 | 11/1949 | Strezynski | 233—2 |
| 2,539,896 | 1/1951 | Dalrymple | 55—400 X |
| 2,785,765 | 3/1957 | Cornell | 233—21 X |
| 3,104,964 | 9/1963 | Craft | 55—406 |

FOREIGN PATENTS

| 129,253 | 9/1948 | Australia. |
|---|---|---|

HARRY B. THORNTON, *Primary Examiner.*

D. E. TALBERT, JR., *Assistant Examiner.*